Aug. 16, 1955   E. B. STROMBERG   2,715,279
BOILER TUBE PROBE
Filed May 11, 1953   2 Sheets-Sheet 2
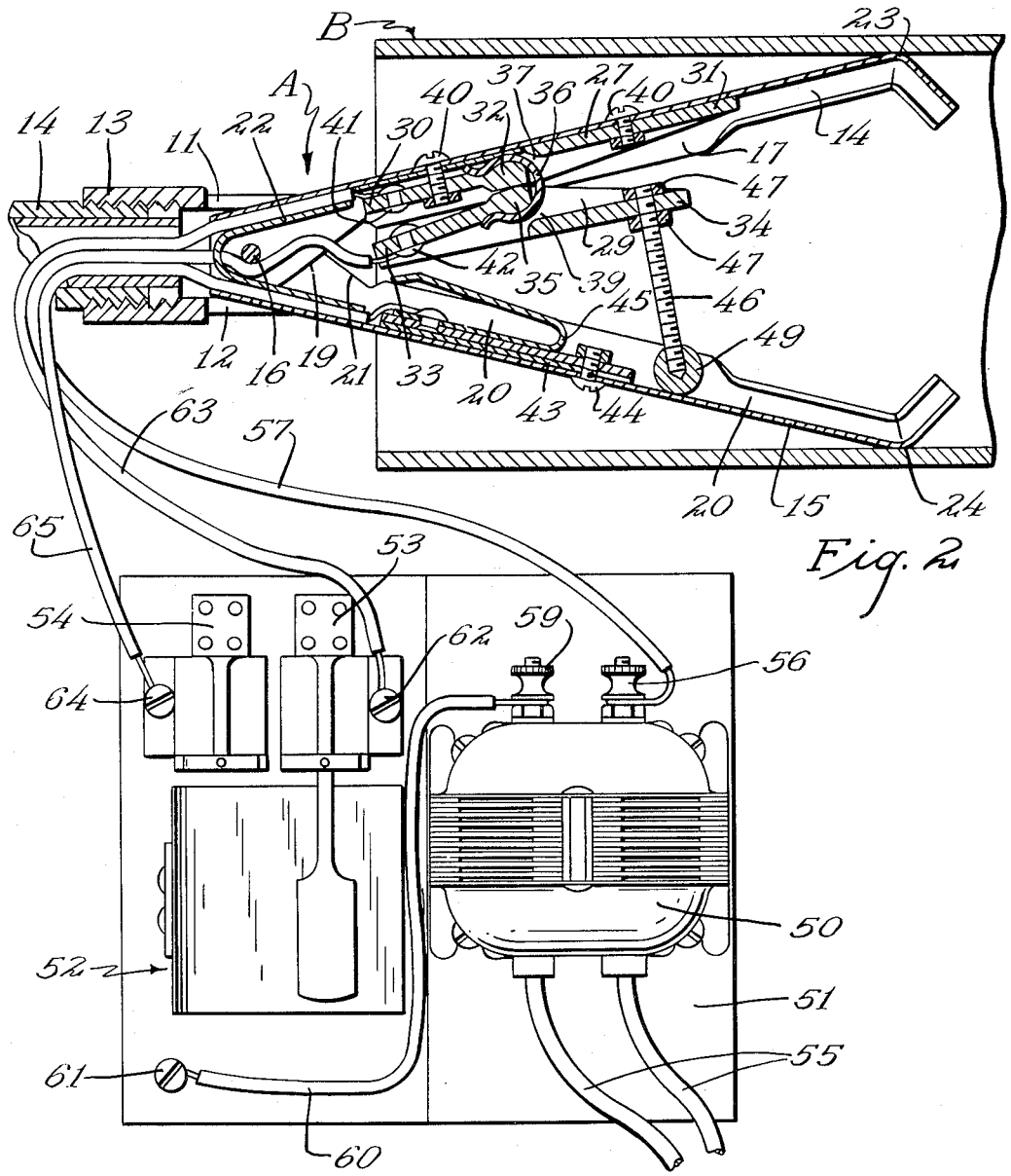
Fig. 2
INVENTOR
Enoch B. Stromberg
ATTORNEY

2,715,279

BOILER TUBE PROBE

Enoch B. Stromberg, St. Paul, Minn.

Application May 11, 1953, Serial No. 353,994

4 Claims. (Cl. 33—149)

This invention relates to an improvement in boiler tube probe and deals particularly with a device capable of measuring variance in internal diameter of tubular members.

Difficulties are often experienced in determining variance in tubular members which are normally sealed within a chamber. For example, boiler tubes are usually anchored at opposite ends and extend through a heating compartment to which access is difficult or impossible. The examination of these boiler tubes is thus difficult and often times there is no warning before a tube develops a break. In actual practice, the tubes often expand in a weakened area forming an outward enlargement prior to the actual break. However, as the exterior surface of the tubes cannot be easily inspected, no warning is provided prior to an actual break.

A feature of the present invention lies in the provision of a probe which is capable of providing an indication when enlargements in such tubes occur. By passing the probe through the tube, an indication is immediately provided when an enlarged section is found, thereby providing a warning of the existing difficulty.

A further feature of the present invention resides in the provision of a boiler tube probe which is capable of indicating restrictions in the tube diameter. As the probe passes through the tube and encounters a restricted area, portions of the probe are moved closer together and an indication of the restriction is provided. These indications occur automatically as the probe is moved through the length of the tube; therefore, providing a quick manner of testing boiler tubes and the like.

While I have described my device as being partly adaptable for the indication of variance in diameter of boiler tubes, the device may be similarly used for various other purposes in which such an indication is provided.

These and other objects and novel features of the invention will be more clearly and fully set forth in the following specification and claims.

In the drawings forming a part of the specification:

Figure 2 is a sectional view through the probe showing diagrammatically the electrical connections thereto.

Figure 3 is a perspective view of the switch mechanism.

Figure 1:
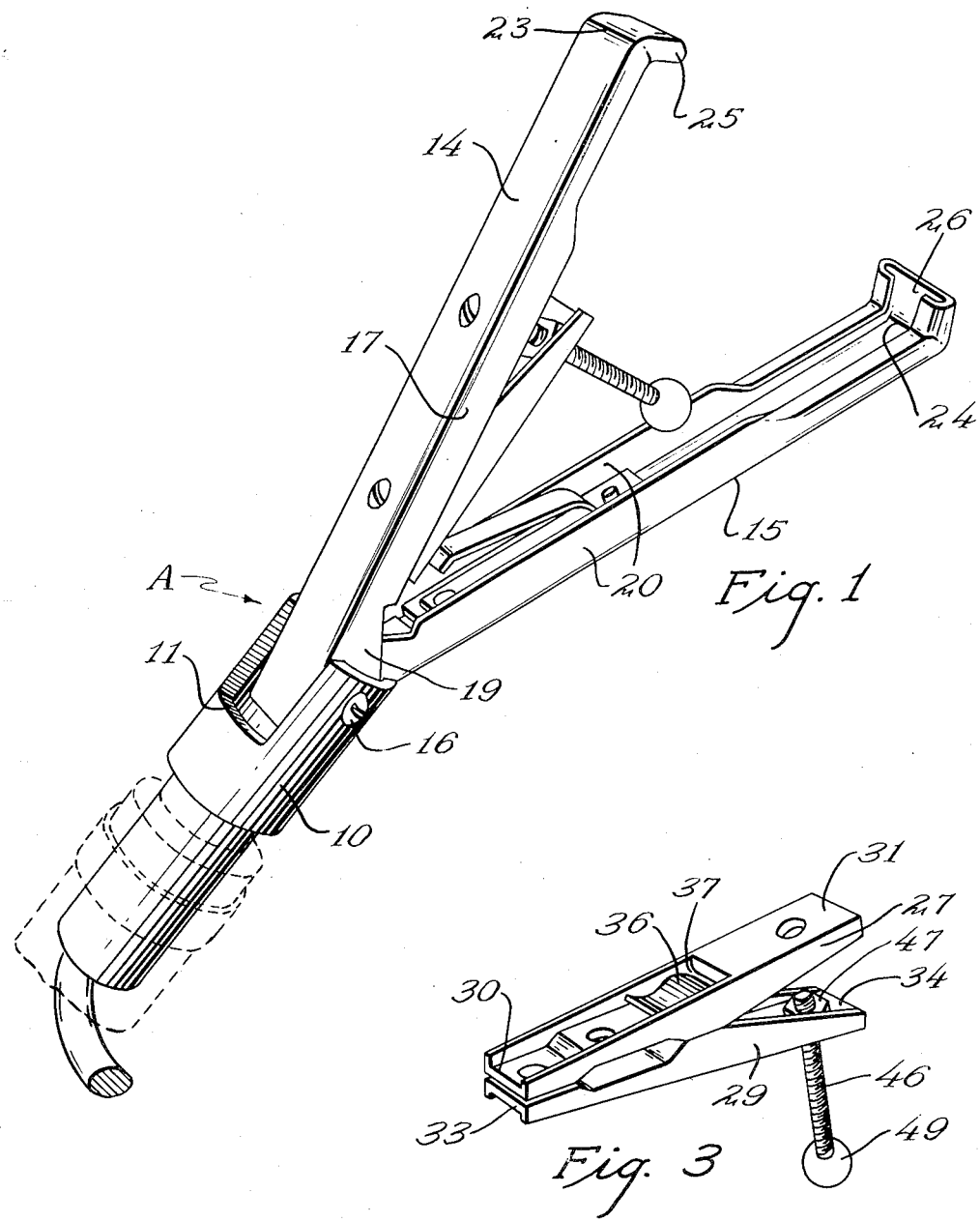
Figure 1 is a perspective view of a boiler tube probe showing the construction thereof.

The boiler tube probe is indicated in general by the letter A. The device includes a sleeve 10 having opposed longitudinally extending slots 11 and 12 extending into one end of the same, these slots being diametrically opposed. The unslotted end of the sleeve 10 is internally threaded as indicated at 13 to accommodate a tubular handle member 14. This handle member may be elongated if the apparatus is to be used in straight tubes or may be short in length for telescopic connection with a flexible tubular handle if the probe is to be used in curved pipes.

A pair of probe arms 14 and 15 are pivotally connected at 16 for pivotal movement toward and away from one another. The probe arm 14 is channel shaped in construction through the most of its length having side flanges 17 which are widened or enlarged at the hinged end as shown at 19, to accommodate the pivot bolt 16. The probe bar 15 is similarly channel shaped, being provided with side flanges 20 which are enlarged in area at the hinge and as indicated at 21. The flanges 19 and 21 overlap at the hinged ends of the arms and the pivot bolt 16 extends through these flanges 19 and 21 as well as diametrically through the slotted end of the sleeve 10. The slots 11 and 12 are located to permit operation of the arms 14 and 15.

A generally U-shaped flat spring 22 extends between the arms 14 and 15, the closed end of the U extending around the pivot 16. The spring 22 urges the arms apart beyond the normal diameter of any tube such as B into which the probe is to extend.

The ends of the arms 14 and 15 are strengthened by turning the edges of the flanges 17 and 20 inwardly into opposed relation. The extremities of the arms are bent at 23 and 24 respectively to form inwardly directed ends 25 and 26, which permit the arms to slide through the tube with little difficulty. In other words, as indicated in Figure 2, the inwardly inclined ends 25 and 26 act to elevate the arms over obstructions within the tubular members B.

A pair of arms 27 and 29 are provided with relatively thin ends and relatively thicker center portions. The arm 27 is provided with ends 30 and 31 which are relatively thin and an intermediate portion 32 which is of substantial thickness. The arm 29 is similarly provided with relatively thin end portions 33 and 34 and a relatively thick intermediate portion 35. A U-shaped metal spring 36 extends through slots 37 and 39 in the arms 27 and 29, to hold the intermediate portions 32 and 35 of the two arms in contacting relation. The arms are so supported that they may pivot about the thicker intermediate portions 32 and 35. The spring 36 tends to hold the ends 30 and 33 of the arms 27 and 29 in contacting relation, the spring also tending to spread apart the opposite arm ends 31 and 34.

As shown in Figure 2 of the drawings the arm 27 is secured to the probe arm 14 by bolts 40 or other suitable means. A contact 41 is mounted upon the end 30 of the arm 27. A cooperable contact 42 is supported upon the end 33 of the arm 29. These contacts 41 and 42 move into contacting relation in one extreme positon of the arm 29 relative to the arm 27.

A mounting plate of insulation 43 is bolted or otherwise secured at 44 to the probing arm 15. A contact plate 45 of generally U-shaped form is secured to the mounting plate 43 and is insulated from the arm 15. The contact 41 of the arm 27 is also insulated from the corresponding probe arm 14.

An adjustment screw 46 extends through the end 34 of the arm 29 and is adjustably positioned by locking nuts 47. A bearing member 49 of suitable shape is secured to the end of the adjustment member 46 and is designed to engage against the inner surface of the probe arm 15. The engagement between the bearing member 49 and the probe arm 15 acts to pivot the arm 29 upon pivotal movement between the proper arms 15 and 16.

As indicated in Figure 2 of the drawings, a transformer 50 is mounted upon a mounting plate 51 as is also a combination bell and buzzer 52 which includes a bell section 53 and a buzzer section 54. Line wires 55 supply current into the transformer 50. One outlet terminal 56 of the transformer is connected by a conductor 57 to the contact 42 which is double-ended and which is selectively engageable either with the first contact 41 or with the movable contact blade 45. The other terminal 59 of the transformer is connected by the conductor 60 to a common terminal 61 of both the buzzer section 54 and the bell section 53 of the indicator 52. The bell terminal 62 is connected by a conductor 63 to the contact 41. In serial relation with the buzzer is a contact 64 and a conductor leading to the previously mentioned contact plate 45. This completes the circuit. While a buzzer and bell have been described as the indicator, obviously other indicators could be employed and any suitable indication could be provided.

In operation, the adjustment member 46 is adjusted until the arm 29 is supported in an intermediate pivotal position when the outermost portions 23 and 24 of the probe arms 14 and 15 and at a predetermined distance apart. For example, if the boiler tube B has an internal diameter of three inches, the adjustment 46 is actuated by changing the position of the nuts 47 until when the arms 14 and 15 are spread to a maximum separation of three inches, the arm 29 is floating in an intermediate position and the contact 42 is supported in spaced relation both to the first contact 41 and from the contact plate 45.

As the probe is moved through the boiler tube B, and an enlarged section is encountered, the arms 14 and 15 are spread apart. This action permits the arm 29 to pivot in a clockwise direction about the fulcrum point formed by the intermediate portions 32 and 35, swinging the intermediate contact 42 against the first contact 41 and closing the circuit from the transformer 50 to the bell section 53 of the indicator. As a result, the bell will ring, providing an indication that the enlarged diameter portion is present.

In the event the probe arms engage a reduced diameter portion of the tube B, the arms 14 and 15 will hinge together and the bearing 49 will act through the adjustment screw 46 to pivot the arm 29 in a counter-clockwise direction. This causes the intermediate contact 42 to engage the contact plate 45, closing a circuit from a transformer 50 to the buzzer section 54 of the indicator; thereby causing an indication that the restricted portion of the tube has been located.

My device is simple to construct and inexpensive to produce and to operate. It functions automatically to produce one result when an enlarged portion is encountered and a different indication when a smaller portion of the tube is found. Thus, my apparatus will function to produce its desired result in a simple and effective manner.

The transformer 50 may be eliminated from the circuit if preferred. However, this transformer has the advantage of cutting down the voltage applied to the probe, so that moisture or foreign material which might be encountered in the tubes will not cause a short circuit which might be damaging to the equipment or injurious to the operator.

In accordance with the patent statutes, I have described the principles of construction and operation of my boiler tube probe, and while I have endeavored to set forth the best embodiment thereof, I desire to have it understood that obvious changes may be made within the scope of the following claims without departing from the spirit of my invention.

I claim:

1. A device for indicating variations in the internal diameter of tubes including a handle member, a pair of arms pivotally connected at one end to said handle member, means biasing said arms in a diverging direction, a fixed contact on one of said arms, a swingable lever pivotally supported on said one arm having a contact thereon movable into and out of engagement with said fixed contact, and means carried by said swingable lever and slidably engaging the other arm for urging said contacts together when said arms are permitted to diverge a predetermined amount.

2. The structure described in claim 1 in which said last means comprises a rod threadedly mounted at one end to said one arm and having its other end slidably engaging the other arm.

3. The structure described in claim 2 in which said other arm is of channeled configuration when viewed in cross-section and the end of said rod which is in engagement therewith is rounded, the channeled configuration serving to guide said rounded end.

4. The structure described in claim 1 including a U-shaped spring member on said other arm having its free end engageable with the contact on said swingable lever when said arms are permitted to converge a predetermined amount.

References Cited in the file of this patent

UNITED STATES PATENTS

| Number | Name | Date |
|---|---|---|
| 993,084 | Linnahan | May 23, 1911 |
| 1,328,651 | Eames | Jan. 20, 1920 |
| 2,122,664 | Terry | July 5, 1938 |
| 2,254,313 | Poock et al. | Sept. 2, 1941 |
| 2,433,028 | Clapper | Dec. 23, 1947 |
| 2,563,216 | Dale | Aug. 7, 1951 |